Figure 5:
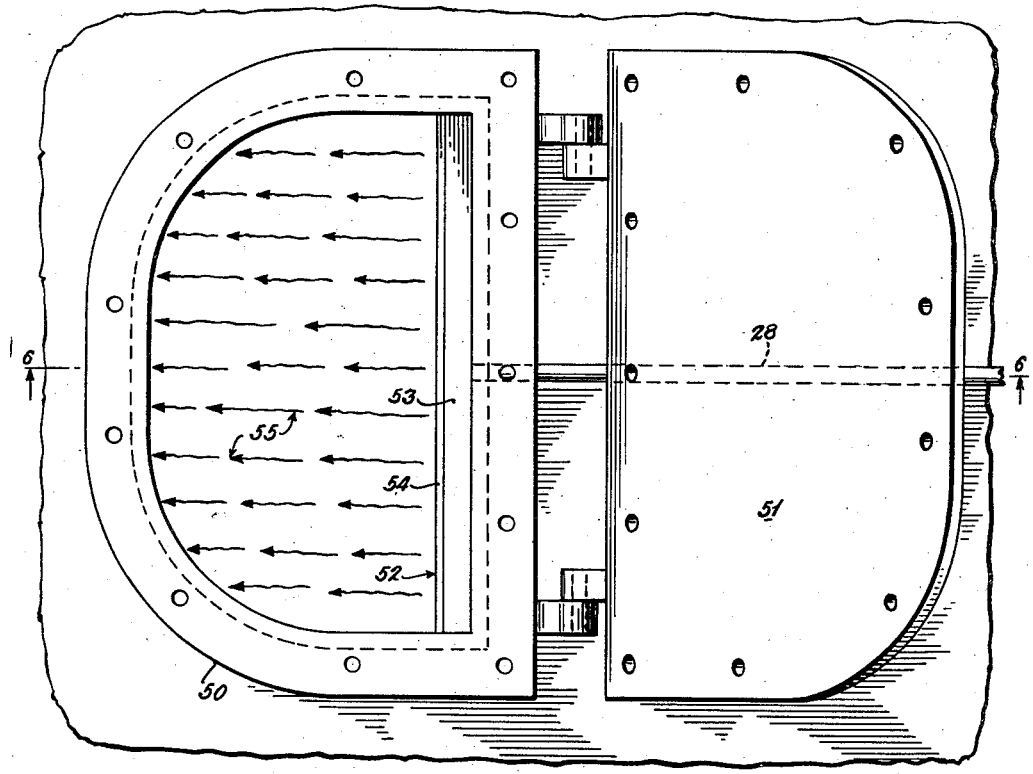

Sept. 14, 1948.  H. V. WILLIAMSON  2,449,436
METHOD AND APPARATUS FOR
PREVENTING EXPLOSIONS
Filed June 9, 1945
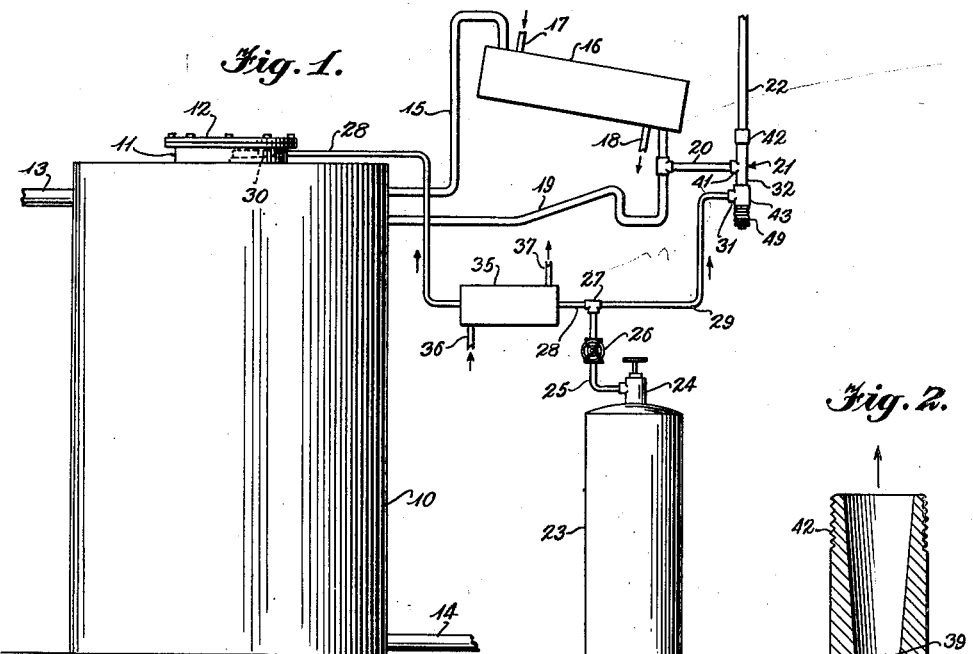
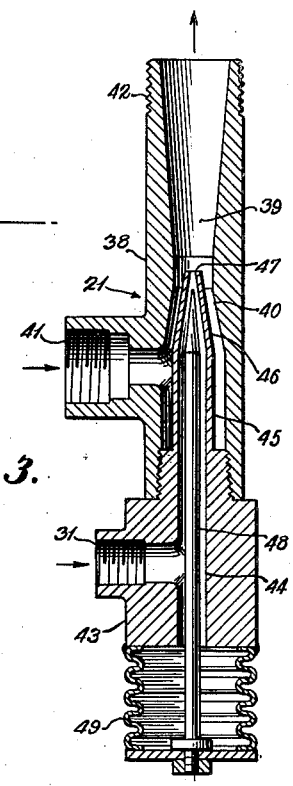
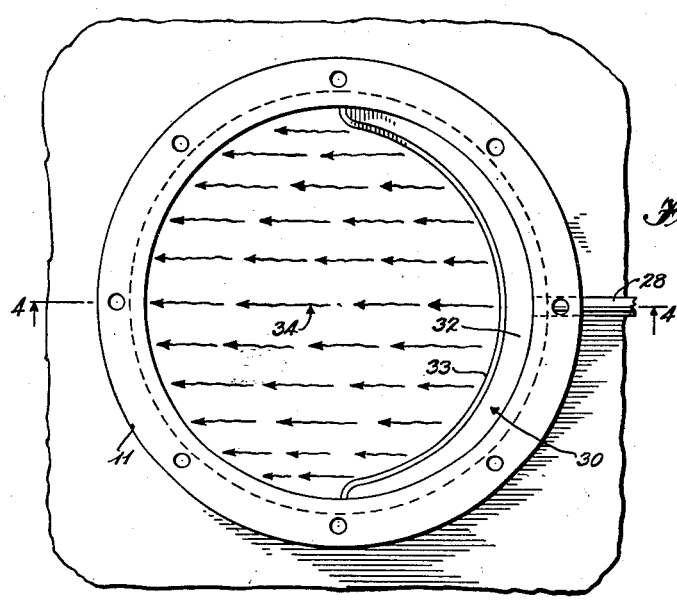
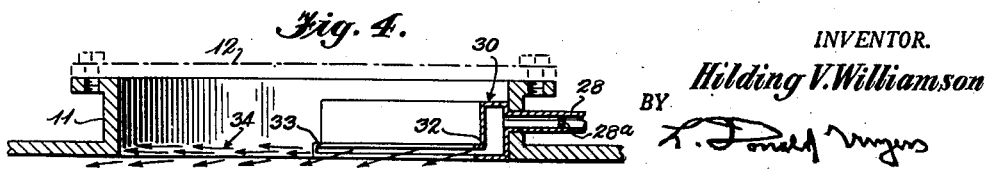
INVENTOR.
Hilding V. Williamson
BY
ATTORNEY INVENTOR.
Hilding V. Williamson
ATTORNEY Patented Sept. 14, 1948

2,449,436

UNITED STATES PATENT OFFICE 2,449,436

METHOD AND APPARATUS FOR PREVENTING EXPLOSIONS

Hilding V. Williamson, Chicago, Ill., assignor to Cardox Corporation, Chicago, Ill., a corporation of Illinois Application June 9, 1945, Serial No. 598,566

10 Claims. (Cl. 169—1)

This invention relates to explosion preventing methods and apparatus and deals more specifically with preventing the formation of explosive atmospheres in connection with the operation of processing equipment using flammable fluids.

In numerous processing plants or installations, it is necessary to make extensive use of fluids, the vapors of which will form explosive mixtures when proper amounts of air are mixed therewith. Such fluids may be confined, during most of the processing periods, in containers, mixers, mills, or the like, for the purpose of effecting extraction, reaction, mixing, dissolving, etc., so that proper control may be exercised at such times to prevent the admission of sufficient air to create an explosive atmosphere. However, it usually is necessary to open up such containers to the atmosphere, at more or less regular intervals, for the purpose of recharging with starting materials, withdrawing processed materials, cleaning, inspecting, or the like, and it usually is impractical, or impossible, to purge the processing chambers of their vapors before air is admitted. Consequently, thousands of dollars worth of process equipment and materials are jeopardized repeatedly, and working conditions for the plant personnel are rendered very dangerous.

The rubberizing of fabric offers an excellent example of the type of process above referred to and will be employed in presenting a disclosure of this invention.

One step performed in the carrying out of the above mentioned process consists of preparing the "dope" that is used to coat or impregnate the fabric. This "dope" is produced by masticating a synthetic rubber material and a suitable solvent, such as methylethylketone, in Pfaudler mixers at the boiling point of the solvent. The mixers, of course, may have any desired capacity. The liquid solvent is piped to the mixers as needed, but it is necessary to open up the mixers for each batch produced, such as by removing a manway cover, to charge the powdered synthetic rubber material into the mixing chamber. When the "dope" is prepared, it is drawn off as required for subsequent operations.

While the manway cover is removed for charging the synthetic rubber material, which is about a ten minute operation, air is admitted to the mixing chamber and solvent vapor escapes to the surrounding atmosphere. The mixing of air with the solvent vapor, both within the mixing chamber and in the surrounding atmosphere, produces an explosive atmosphere that is ignited very readily. Additionally, the man, or men, charging the mixer are exposed to the very obnoxious fumes that rise from the open manway.

It is a primary object of this invention to provide a method of and apparatus for preventing the formation of an explosive atmosphere in or adjacent to processing equipment using flammable fluids when such equipment is opened up for recharging, emptying, cleaning, inspecting, or the like.

A further object of the invention is to provide a method of and apparatus for preventing the escape of flammable vapors from or the admission of pure air to opened processing equipment, so as to avoid the formation of an explosive atmosphere, by creating a negative pressure within the processing chamber of the equipment and simultaneously screening the uncovered opening against the passage of undiluted air or of flammable vapors.

Other objects and advantages of the invention will be apparent during the course of the following description.

In the accompanying drawings forming a part of this specification and in which like numerals are employed to designate like parts throughout the same, Figure 1 is an elevational view of the explosion preventing apparatus embodying this invention operatively applied to a piece of processing equipment, such as a mixer for masticating synthetic rubber material and a solvent.

Figure 6:
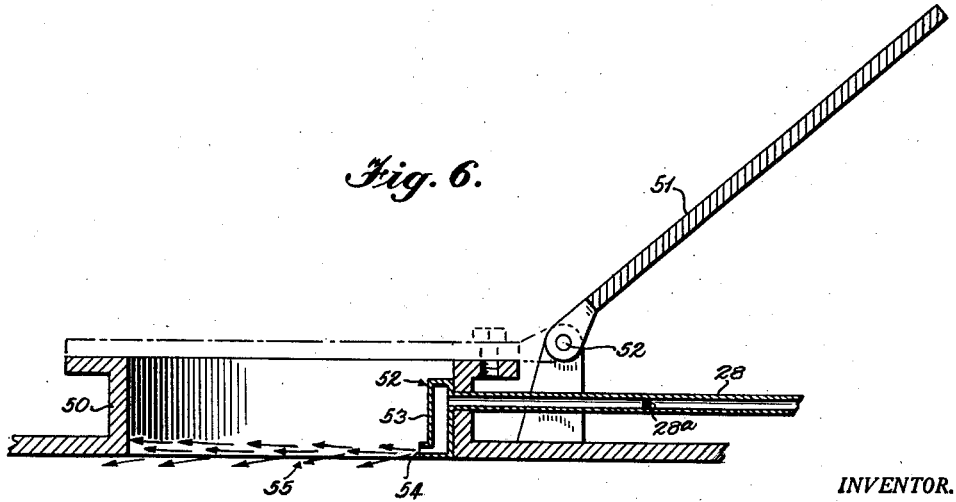

Figure 2 is a detail, longitudinal sectional view of an aspirating device which forms a part of the explosion preventing apparatus disclosed in Fig. 1, Figure 3 is a detail plan view of a manway opening with a discharge nozzle, for a suitable inert gas, positioned therein, Figure 4 is a sectional view taken on line 4—4 of Fig. 3, Figure 5 is a detail plan view disclosing a modified form of manway opening for a processing container with an inert gas discharging nozzle applied thereto, and Figure 6 is a detail sectional view taken on line 6—6 of Fig. 5.

In the drawings, wherein for the purpose of illustration are shown the preferred embodiments of this invention, and first particularly referring to Fig. 1, the reference numeral 10 designates a mixer for masticating finely ground synthetic rubber material with methylethylketone used as a solvent. No attempt has been made to disclose in detail the construction of this mixer other than to illustrate the provision of a manway opening 11 that is provided with a removable cover 12, employed for introducing the finely ground synthetic rubber material each time a batch of "dope" is to be produced, a pipe line 13 for charging the mixer with the solvent, and a pipe line 14 employed for drawing off the "dope" as required for subsequent manufacturing operations.

In operating this type of mixer, steam usually is employed for heating the entire contents to the boiling temperature of the solvent. In order to prevent prohibitive loss of the solvent, excess solvent vapors are permitted to pass out of the mixing chamber through the pipe line 15 to the condenser 16 which is cooled by water that is circulated through the pipes 17 and 18. The condensate is returned to the mixing chamber by the pipe line 19. Any vapors in excess of the capacity of the condenser 16 are vented through the roof of the building by the branch 20, which connects the return line 19 for the condensed vapor to an aspirator 21, and a vent line 22.

With the exception of the aspirator 21, all of the apparatus so far specifically described relates to the conventional mixer installation. The apparatus which embodies this invention and which has been associated with the mixer installation parts to prevent the formation of an explosive atmosphere, when the manway cover 12 is removed for charging the mixer with the finely ground synthetic rubber material, now will be described in detail.

The reference character 23 is employed to designate a suitable source of supply of an inert gas, such as carbon dioxide. This source of supply may take the form of a bank of high pressure carbon dioxide cylinders or it may take the form of a single insulated storage tank in which the carbon dioxide is maintained at a constant low temperature, and its corresponding low vapor pressure, by means of a mechanical refrigerating unit.

The vapor of the carbon dioxide, or other inert gas, is controllably discharged from the source of supply 23 through the manually controlled valve 24 into the branch line 25. The carbon dioxide vapor should be delivered to its discharge devices at a constant pressure, for example, approximately 300 or 500 pounds per square inch and for that reason a pressure control valve 26 is connected in the branch line 25. The branch line 25 is connected by the coupling 27 to the two discharge lines 28 and 29. The discharge line 28 extends to a nozzle 30 that is installed in the manway opening 11. The discharge line 29 is connected to the inlet 31 of the aspirator 21. It will be seen, therefore, that whenever the manual valve 24 is opened, carbon dioxide vapor will be delivered simultaneously to both the nozzle 30 and the aspirator 21.

The nozzle 30 is illustrated in Figs. 3 and 4 as consisting of a crescent-shaped head portion 32 that is provided with a discharge throat or slot 33. The discharge head and throat or slot are so proportioned and are so arranged that they will discharge the carbon dioxide vapor at a very low uniform velocity as a screen or curtain 34 which bridges the entire area of the manway opening. An orifice 28a is provided in pipe 28 to further assist in obtaining the low uniform velocity discharge desired. This carbon dioxide vapor curtain or screen will prevent the admission of undiluted air to the mixer 10 and the discharge of undiluted solvent vapor from the mixer when the manway cover 12 is removed to open up the mixer to the atmosphere.

If the carbon dioxide vapor discharged through the nozzle 30 it at a temperature that is low enough to cool the surrounding atmosphere below its dew point, the moisture content of the air will be formed into a fog of water droplets or water ice particles and vision through the manway opening, into the interior of the mixer 10, will be obstructed. If it is considered desirable to avoid the formation of such a fog, a suitable heater 35 is connected in the discharge line 28. This heater may be supplied with steam, hot water, or the like, by the circulating lines 36 and 37.

The previously referred to aspirator 21 includes a main body portion 38 having a bore 39 that is reduced in diameter at 40 to form a venturi. The previously referred to branch line 20 is connected to the inlet opening 41 of the aspirator body 38 so that any solvent vapor that flows into this aspirator body must pass through the venturi portion 40. The discharge end 42 of this aspirator body 38 is connected to the vapor discharge line 22.

The opposite end of the aspirator body 38 is threadedly connected to the body part 43 which includes the carbon dioxide vapor inlet opening 31. This body part 43 is provided with a bore 44 which communicates with the bore of the tubular extension 45 that terminates in a tapered valve seat portion 46 having an outlet orifice 47. This outlet orifice is illustrated as being located slightly downstream of the most restricted portion of the venturi 40 and will cause the jet of carbon dioxide vapor discharged through the orifice 47 to create a suction within the venturi 40, the inlet opening 41, and the pipe lines 19 and 20 that extend to the vapor space of the mixer 10. Consequently, the discharge of carbon dioxide from the restricted orifice 47 will result in withdrawing solvent vapor from the chamber of the mixer 10 and will discharge this withdrawn vapor through the roof of the building by way of the pipe line 22. This withdrawal of solvent vapor from the mixer 10 will, when the manway cover 12 is removed, create a slight vacuum or negative pressure within the mixer 10.

To prevent the carbon vapor discharge orifice 47 from becoming clogged with solvent, or the like, a needle valve 48 is arranged within the bore 44 of the body part 43 and the bore of the extension 45. The outer end of the stem of this needle valve is connected to a bellows 49. It will be noted that the interior of this bellows communicates with the bore 44 of the casing part 43 so that whenever carbon dioxide is admitted to this bore 44, the pressure of the carbon dioxide vapor will expand the bellows 49 to withdraw the pointed end of the needle valve 48 from the orifice 47. Fig. 2 of the drawings illustrates the needle valve in its abnormal, or carbon dioxide vapor pressure retracted, position. In other words, the bellows 49 is assumed to be expanded from its normal contracted condition to effect opening of the needle valve 48.

The operation of this explosion preventing apparatus will be described as follows.

When it becomes necessary to remove the manway cover 12 of the mixer 10, for the purpose of charging the mixer with synthetic rubber material, inspecting the interior of the mixer, or the like, the manual valve 24 is opened to discharge carbon dioxide vapor through both pipe lines 28 and 29. Preferably, the valve 24 should be opened just prior to the removal of the cover 12.

The carbon dioxide vapor discharging through the aspirator 21 will create a slight negative pressure within the chamber of the mixer 10 by withdrawing solvent vapor from this chamber and discharging it to the atmosphere outside of the building housing the mixer by way of the pipe lines 19, 20 and 22.

The carbon dioxide that is delivered to the nozzle 30, located within the manway opening, will be discharged as a curtain or screen across this opening and, when the manway cover 12 is removed, will be drawn into the chamber of the mixer 10 by the negative pressure prevailing therein. If the negative pressure in the mixer chamber and the discharge rate of the carbon dioxide are correctly proportioned, some of the carbon dioxide will be drawn into the mixer chamber and the remainder will be discharged into the atmosphere with the result that no air will enter the mixer and no solvent vapor will leave the mixer. Sufficient carbon dioxide should enter the mixer chamber to cause the resultant carbon dioxide and solvent vapor mixture to contain at least 25% carbon dioxide vapor. It has been determined that an explosive atmosphere will not be produced within the chamber of the mixer 10 if carbon dioxide vapor is discharged through the nozzle 30 at the rate of 4 pounds per minute and carbon dioxide is discharged through the aspirator 21 at the rate of 1 pound per minute. Gas analyses made of the contents of the mixer chamber show that a carbon dioxide concentration in excess of 25% is present when the manway cover 12 is removed and a carbon dioxide concentration in excess of 65% is built up in approximately five or six minutes from the time the cover is removed.

Figs. 5 and 6 disclose a slightly modified form of manway opening 50 with a cover 51 hinged at 52 so that it can be swung into an open position. The carbon dioxide vapor discharge line 28 extends through the wall of the manway opening 50 for connection with the discharge nozzle 52. This nozzle includes a rectangular body portion 53 that terminates in a discharge opening or slot 54 arranged to deliver a curtain or screen of carbon dioxide vapor 55 across the manway opening. This carbon dioxide discharge nozzle 52 functions in the same manner as the nozzle 30 shown in Figs. 1, 3 and 4.

It is to be understood that I do not desire to be limited to the exact order of method steps as they have been disclosed, for variations and modifications of the same, which fall within the scope of the accompanying claims, are contemplated. It further is to be understood that the particular types of apparatus herein shown and described are to be taken as preferred examples of the invention, and that various changes in the shape, size, and arrangement of parts may be resorted to without departing from the spirit of the invention or the scope of the subjoined claims.

Having thus described the invention, I claim:

1. A method of preventing the development of a vapor and air explosive mixture during periods when a normally closed vapor confining container, having a vent to the atmosphere for excess vapor, is directly opened to the surrounding atmosphere, comprising maintaining a source of supply of an inert gas under pressure, and, during a period starting in advance of opening the container and continuing as long as the container is open, discharging a portion of said gas through the vapor vent of the container in suction producing relation to the latter to create and maintain a negative pressure therein, and simultaneously discharging additional gas across the container opening to form a curtain that will prevent the escape of vapor from the container through the opening and will dilute the vapor in the container to such an extent that an explosive mixture will not be formed in the container.

2. A method of preventing the development of a vapor and air explosive mixture during periods when a normally closed vapor confining container, having a vent to the atmosphere for excess vapor, is directly opened to the surrounding atmosphere, comprising discharging an inert gas through the vapor vent of the container in suction producing relation to the latter to create and maintain a negative pressure therein, and simultaneously preventing the forming of an explosive mixture of air and vapor in the container by discharging additional gas so that it will be drawn into the container, as a result of said negative pressure.

3. A method of preventing the development of a vapor and air explosive mixture during periods when a normally closed vapor confining container, having a vent to the atmosphere for excess vapor, is directly opened to the surrounding atmosphere, comprising discharging an inert gas at a controlled low pressure through the vapor vent of the container in suction producing relation to the latter to create and maintain a negative pressure therein, heating additional inert gas to a temperature that is high enough to prevent it from cooling the atmosphere surrounding the container to its dew point, and simultaneously discharging this heated gas at a controlled low pressure across the container opening to form a curtain that will prevent the escape of vapor from the container through the opening and will dilute the vapor in the container to such an extent that an explosive mixture of air and vapor will not be formed in the container.

4. A method of preventing the development of a vapor and air explosive mixture during periods when a normally closed vapor confining container, having a vent to the atmosphere for excess vapor, is directly opened to the surrounding atmosphere, comprising discharging an inert gas through the vapor vent of the container in suction producing relation to the latter to create and maintain a negative pressure therein by withdrawing vapor from the container and diluting the vapor as it is vented, and simultaneously screening the container opening against the passage of undiluted vapor and undiluted air therethrough by discharging additional gas across said opening.

5. An explosion prevention system, comprising the combination with a vapor confining container having a manway opening normally closed by a cover that is removed to open up the container to the atmosphere and having a vent line extending to the atmosphere for excess vapor, of a source of supply of an inert gas under pressure, discharge piping for the gas having branches leading to the vapor vent line and manway opening, respectively, of the container, means connected to one of the branches and operating when the manway cover is removed to discharge gas into the vapor vent line to create a suction therein to withdraw vapor from the container for producing a negative pressure in the latter, means connected to the other branch line for discharging gas in the uncovered manway so that the gas will be drawn into the container as a result of the negative pressure in the latter, and control means in the discharge piping for simultaneously starting and stopping the flow of gas through both of said branches.

6. An explosion prevention system, comprising the combination with a vapor confining container having a manway opening normally closed by a cover that is removed periodically to open up the container to the atmosphere and having a vent line extending to the atmosphere for discharging excess vapor, of a source of supply of an inert gas under pressure, discharge piping for the gas having branches leading to the vapor vent line and to the manway opening, respectively, of the container, an aspirator connected to one of the branches and in the vapor vent line and operating when the manway cover is removed to create a suction in the vent line for withdrawing vapor from the container to produce a negative pressure in the latter, a valve normally closing the gas discharge opening of the aspirator, means operated by the delivery of gas to the aspirator for opening said valve, means connected to the other branch for discharging gas into the uncovered manway so that the gas will be drawn into the container as a result of the negative pressure in the latter, and control means in the discharge piping for simultaneously starting and stopping the flow of gas through both branches.

7. An explosive prevention system of the type covered by claim 5 further characterized by the means connected to one of the branches of the gas discharge piping comprising an aspirator also connected to the vapor vent line.

8. An explosion prevention system of the type covered by claim 5 further characterised by the means connected to the other branch line comprising a nozzle for discharging a curtain of gas across the uncovered manway opening.

9. An explosion prevention system of the type covered by claim 5 further characterised by the means connected to one of the branches of the gas discharge piping comprising an aspirator also connected to the vapor vent line, and the means connected to the other branch line comprising a nozzle for discharging a curtain of gas across the uncovered manway opening.

10. An explosion preventing system of the type covered by calim 6 further characterised by the means connected to the other branch line comprising a nozzle for discharging a curtain of gas across the uncovered manway opening.

HILDING V. WILLIAMSON.

REFERENCES CITED

The following references are of record in the file of this patent:

UNITED STATES PATENTS

| Number | Name | Date |
|---|---|---|
| 2,153,555 | Gallery | Apr. 11, 1935 |